Figure 1:
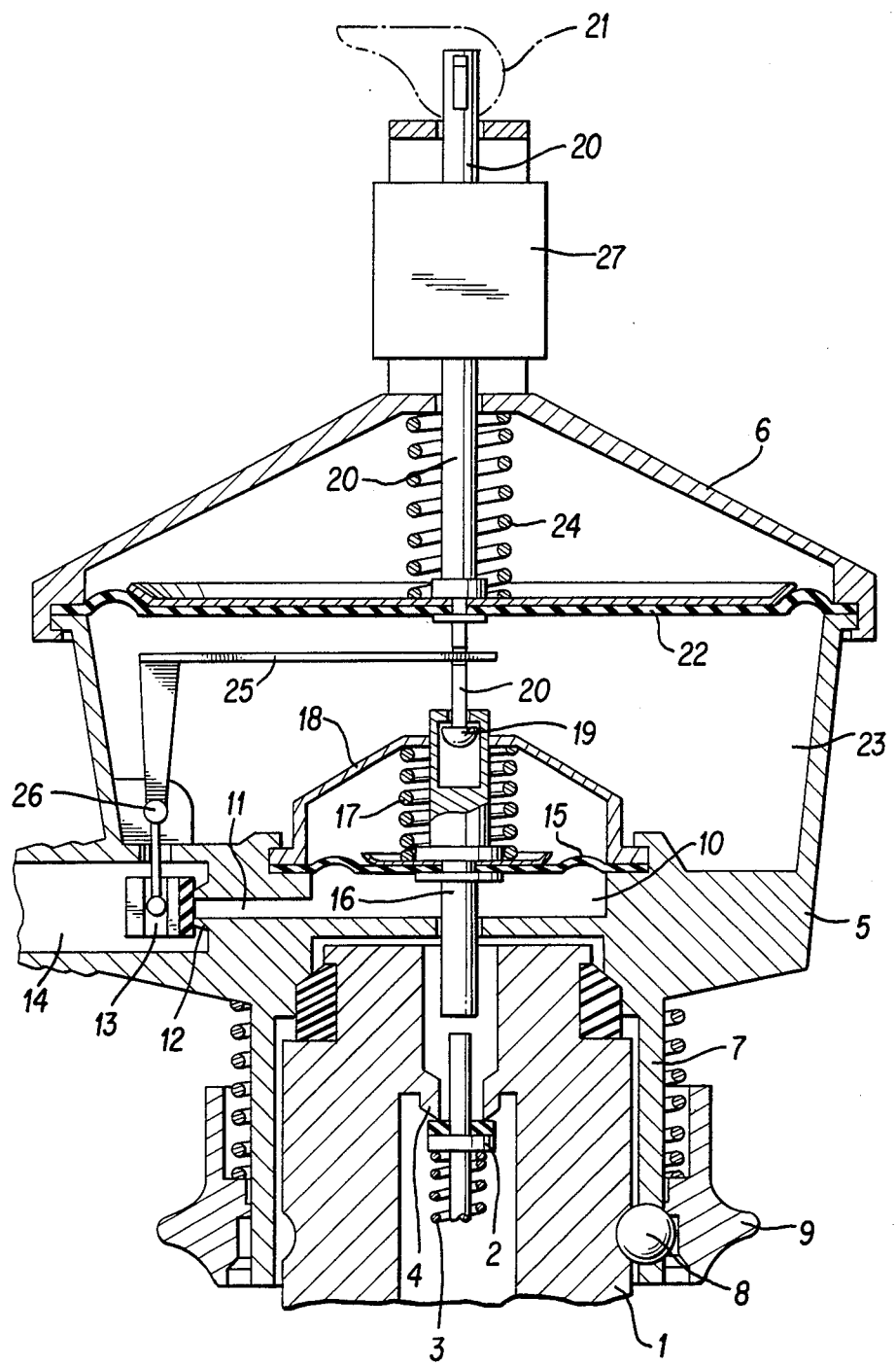

United States Patent [19]

Hansen et al.

[11] Patent Number: 4,550,746

[45] Date of Patent: Nov. 5, 1985

[54] REGULATOR FOR MOUNTING ON THE OUTLET CONNECTION OF A GAS CYLINDER OR LIKE CONTAINER

[75] Inventors: Frits U. Hansen, Rungsted Kyst; Ove Jensen, Helsingor, both of Denmark

[73] Assignee: Kosan Teknova A/S, Niva, Denmark

[21] Appl. No.: 637,712

[22] Filed: Aug. 3, 1984

[30] Foreign Application Priority Data

Aug. 11, 1983 [DK] Denmark .............................. 3662/83

[51] Int. Cl.⁴ ............................................. F16K 17/00
[52] U.S. Cl. .................................. 137/461; 137/458; 137/505.12
[58] Field of Search ..................... 137/458, 461, 505.12

[56] References Cited

U.S. PATENT DOCUMENTS 3,043,332 7/1962 Henriques ..................... 137/505.12
3,892,258 7/1975 Hendrick ............................ 137/461

FOREIGN PATENT DOCUMENTS 2523845 5/1975 Fed. Rep. of Germany .

Primary Examiner—Harold W. Weakley
Attorney, Agent, or Firm—Anthony A. O'Brien

[57] ABSTRACT

The housing (5, 6) of the regulator contains a medium-pressure chamber (10) to which gas is supplied from the cylinder when a self-closing cylinder valve (2) is open and which communicates with the regulator outlet (14) through a further valve (b 13), and a low-pressure chamber (23) in open communication with the outlet. The medium-pressure chamber (10) has a diaphragm wall (15) with a spindle (16) for controlling the cylinder valve (2). The low-pressure chamber (23) has a diaphragm wall (22) for controlling the further valve (13) through a connecting rod (20) carried by the diaphragm wall and coacting at its upper end with a manual selector (21) and at its lower end with the valve opener spindle (16). By means of the selector the connecting rod may be locked in a raised position in which the cylinder valve (2) is closed.

The connecting rod (20) is associated with a lockable spring mechanism (27) which is unlocked in response to a predetermined overpressure in the low-pressure chamber and which then moves the connecting rod to its raised position. This prevents a leakage of gas in case of a ruptured diaphragm or flexible tube if the further valve (13) does not close tightly when the gas consumption has been discontinued.

1 Claim, 2 Drawing Figures

REGULATOR FOR MOUNTING ON THE OUTLET CONNECTION OF A GAS CYLINDER OR LIKE CONTAINER

This invention relates to a regulator adapted to be mounted on the outlet connection of a gas cylinder or similar receptacle; comprising a housing releasably connectable to said outlet connection and having a spring-biased spindle for controlling a self-closing valve in the outlet connection, and a spring-biased diaphragm forming a wall of a low-pressure chamber and adapted to control a valve upstream of the outlet of the regulator in response to the pressure in the low-pressure chamber, which control spindle is operatively coupled, via a connecting rod movable in unison with the diaphragm, to a manually operable open/close-selector, said selector being pivotally supported on a bearing pin secured in the top part of the housing and oriented transversely of the connecting rod, and having a cam face which is eccentric relative to the bearing pin so that the selector may be pivoted between a first position in which the control spindle is lifted clear of the valve in the outlet connection against the force of the biasing spring acting on the spindle, and a second position in which the spindle is free to perform an automatic control of said valve.

In such known regulators it is a condition that the valve in the outlet connection of the gas cylinder is closed, not only when the regulator is dismounted, but also when the regulator is mounted and the connecting rod thereof occupies its said first position. A further condition is that the valve upstream of the regulator outlet is tightly closed when there is no consumption of gas through the regulator. If this latter condition is not fulfilled, e.g. due to the presence of dirt on the spindle, valve member, or valve seat of that valve, the pressure in the outlet nozzle and in the low-pressure chamber may rise to an abnormal value and create a risk of rupture of the low-pressure chamber diaphragm or of the flexible tube connecting the outlet nozzle with the gas consuming apparatus, or the diaphragm or the tube may become dislodged.

It is known to counteract this risk by providing a diaphragm safety valve which in response to a certain pressure rise in the low-pressure chamber permits the escape of gas from that chamber to the atmosphere. This solution is satisfactory when the gas cylinder and the regulator are located in the open air because larger escape of gas occurs only under quite extraordinary circumstances, but in some countries there are statutory provisions which forbid indoor use without an efficient ventilation, based on the assumption that gas leaking out may cause a risk of fire or explosion.

An object of the present invention is to eliminate that element of risk in a regulator of the kind referred to in the initial paragraph above.

According to the invention the regulator is characterized in that the cam face of the selector cooperates with an axially displaceable spring retainer associated with a compression spring interposed between that retainer and the housing, and that the selector comprises a spring-biased, manually releasable locking pin which in the open-position of the selector engages in a bore in the spring retainer, which bore also receives the end portion of the connecting rod, whereby an upward movement of the rod causes automatic disengagement of the locking pin.

In the dangerous situation explained above the overpressure in the low-pressure chamber will result in a forced lifting of the connecting rod and when the lifting movement exceeds a certain magnitude, the upper end portion of the rod will lift the locking pin out of the bore, following which the springloaded retainer will pivot the selector to its first position. The effect will be the same as when the selector is manually moved to closed-position, because in both cases the regulator spindle is pulled clear of the cylinder valve which consequently moves to its closed position instantanously. This stops the flow of gas from the cylinder or similar container, and consequently the outflow of gas through the low-pressure chamber and the imperfectly closing outlet valve will stop rapidly and no danger of fire and explosion will arise. The special spring mechanism does not influence the regulator function as long as the cylinder valve operates as intended, i.e. that not only does it open to a larger or smaller extent dependent on the instantaneous consumption, but it also closes completely when the consumption ceases. On the other hand, the spring mechanism becomes effective in case of an inadmissible pressure rise in the low-pressure chamber, and subsequently it maintains the connecting rod in the position corresponding to closed cylinder valve, so that a manual actuation of the selector is required before gas can next time be delivered via the regulator. Consequently the imperfect condition of the regulator is called to the attention of the user who may then take any appropriate measures.

A preferred embodiment of a regulator according to the invention will be described in more detail below with reference to the accompanying drawings, in which:

FIG. 1 is an axial section through a gas cylinder regulator of a type known per se, but provided with a schematically shown locking mechanism as mentioned above, and FIG. 2 is an axial section through the locking mechanism on a larger scale.

The structure of the gas cylinder regulator shown in FIG. 1 is substantially known except for the particular, lockable spring mechanism which has only been indicated schematically in FIG. 1.

The outlet connection 1 of the gas cylinder contains an ordinary stop valve 2 which is biased towards its seat 4 by a spring 3 and by the pressure prevailing within the gas cylinder (not shown).

The housing of the regulator comprises a lower part 5 and an upper part 6, the former of which comprises a skirt 7 surrounding the connection 1 and releasably connected thereto by means of a plurality of balls 8 and an associated locking ring 9.

At the bottom of the lower part 5 of the regulator housing there is a medium-pressure chamber 10 which receives gas from the cylinder when valve 2 is open, and which communicates with a duct 11 terminating in a seat 12 associated with a valve 13 which in its open position permits a flow of gas through an outlet nozzle 14 which may be connected to a gas consuming apparatus by a flexible tube.

The top wall of medium-pressure chamber 10 is formed by a diaphragm 15, which carries a central spindle 16 and which is biased downwardly by a spring 17 acting between the diaphragm and a spring seat 18 secured in housing part 5. By moving downwards spindle 16 may open cylinder valve 2, but in the closed position of the regulator, as shown, that movement is prevented by a head 19 of a connecting rod 20 which is kept raised by a manually operable selector 21 on top of the upper housing part 6. When the selector is pivoted clockwise, spindle 16 is liberated to open valve 2 to a larger or smaller degree dependent on the pressure in medium-pressure chamber 10.

Rod 20 is mechanically secured to the centre area of a further diaphragm 22 provided between housing parts 5 and 6 and forming the top wall of a low-pressure chamber 23. Chamber 23 communicates freely with outlet 14 so that the pressure in that chamber varies dependent on the instantaneous consumption. Diaphragm 22 is biased in downward direction by a spring 24 and during normal operation of the regulator its deflection is within a certain range whereby it controls, through rod 20 and a bell-crank lever 25 engaging with rod 20, the valve 13 between medium-pressure chamber 10 and outlet 14.

These structural details and their function form part of the prior art.

If valve 13 does not close tightly against seat 12, after the consumption has been discontinued, an extraordinary pressure increase occurs in outlet 14 and low-pressure chamber 23 resulting in the fire and explosion danger explained above. For avoiding that situation an arresting or locking mechanism 27 has been interposed between housing part 6 and the manually operable selector 21. Mechanism 27 does not influence the normal function of the regulator, but it is released in response to an extraordinary pressure rise in low-pressure chamber 23 and a resulting extraordinary lifting movement of diaphragm 22 whereby it displaces connecting rod 20 still further upwards, viz. to the position shown in FIG. 1 in which spindle 16 is clear of cylinder valve 2 which consequently has closed against seat 4. Closing of valve 2 prevents further leakage of gas to medium-pressure chamber 10 and thus also to outlet 14 and low-pressure chamber 23, thus preventing said danger. When rod 20 is lifted selector 21 pivots back to the position shown thus indicating to the user that spring mechanism 27 has reacted so that renewed actuation is required for permitting delivery of gas through the regulator to a consumer.

Figure 2:
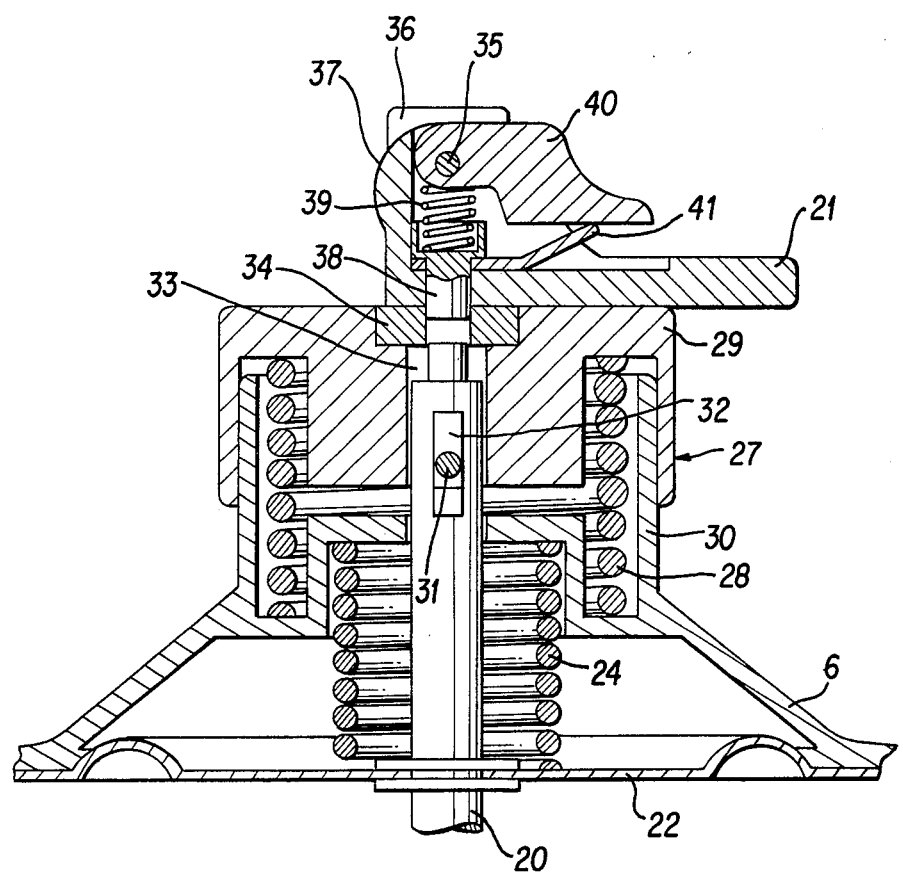

In the embodiment of the locking mechanism 27 shown in FIG. 2 a compression coil spring 28 is interposed between upper housing part 6 and a spring retainer 29 which slidably surrounds a collar 30 on the housing and in which there is secured a pin 31 extending transversely through an oblong hole 32 in the upper end portion of rod 20. Said end portion extends part-way through a bore 33 provided in retainer 29. A wear-resistant element 34 is provided in the upper end of bore 33. Selector 21 is pivotally supported by a pin 35 extending through a pair of tabs 36 integral with housing part 6, and it is formed with a cam face 37 which is eccentric relative to the pin and which cooperates with the upper surface of spring retainer 29. As shown in FIG. 2 selector 21 is in its position corresponding to cylinder valve 2 being open, and retainer 29 has been depressed whereby the force exerted by spring 28 has increased. Selector 21 is locked in that position by a locking pin 38 which is downwardly biased by a spring 39 and thus maintained in engagement wiith the continuation of bore 33 extending throuugh wear element 34.

For unlocking selector 21 so that it can be pivoted on pin 35 to closing position, locking pin 38 may be lifted, either manually by depressing an actuator 40 which acts on the pin through a pivotal lever 41, or automatically in the above described situation in which an excessive pressure prevails below diaphragm 22. Such pressure causes diaphragm 22 to lift rod 20, the upper end of which forces locking pin 38 out of the bore through element 34 against the force of spring 39. Through spring retainer 29 spring 28 then initiates an anticlockwise pivoting of selector 21 resulting in rod 20 being still further raised so that valve 2 moves to closing position.

I claim:

1. A regulator adapted to be mounted on the outlet connection (1) of a gas cylinder; comprising a housing (5, 6) releasably connectable to said outlet connection and having a spring-biased spindle (16) for controlling a self-closing valve (2) in the outlet connection, and a spring-biased diaphragm (22) forming a wall of a low-pressure chamber (23) and adapted to control a valve (13) upstream of the outlet (14) of the regulator in response to the pressure in the low-pressure chamber, said control spindle (16) being operatively coupled, via a connecting rod (20) movable in unison with the diaphragm (22), to a manually operable open/-close-selector (21), said selector (21) being pivotally supported on a bearing pin (35) secured in the top part (6) of the housing and oriented transversely of the connecting rod (20), and having a cam face (37) which is eccentric relative to the bearing pin (35) so that the selector may be pivoted between a first position in which the control spindle (16) is lifted clear of the valve (2) in the outlet connection against the force of the biasing spring (17) acting on the spindle, and a second position in which the spindle is free to perform an automatic control of said valve (2), characterized in that the cam face (37) of the selector cooperates with an axially displaceable spring retainer (29) associated with a compression spring (28) interposed between that retainer and the housing, and that the selector (21) comprises a spring-biased, manually releasable locking pin (38) which in the open-position of the selector engages in a bore (33) in the spring retainer (29), which bore (33) also receives the end portion of the connecting rod (20), whereby an upward movement of the rod causes automatic disengagement of the locking pin.

* * * * *